United States Patent Office.

JOSEPH B. PALSER AND GARDNER HOWLAND, OF FORT EDWARD, NEW YORK.

*Letters Patent No.* 26,202, *dated November* 22, 1859; *reissue No.* 2,665, *dated July* 2, 1867.

IMPROVEMENT IN THE MANUFACTURE OF PAPER PULP.

The Schedule referred to in these Letters Patent and making part of the same.

TO ALL WHOM IT MAY CONCERN:

Be it known that we, JOSEPH B. PALSER and GARDNER HOWLAND, of Fort Edward, in the State of New York, have invented a new and useful Improvement in the Manufacture of Paper Pulp; and we do hereby declare that the following is a clear, full, and exact description thereof.

In the manufacture of paper pulp from straw and other fibrous materials, we employ sixty gallons of caustic alkaline liquor, of a strength indicating $3\frac{1}{2}°$ to $3\frac{3}{4}°$ Baumé to every hundred pounds of cut straw. The alkaline liquors and straw having been placed in a rotary steam boiler, and the man-hole of the latter closed, the fire is applied below, and a pressure of one hundred and ten to one hundred and thirty pounds to the square inch is raised in the rotary by means of fire-heat applied thereto. This pressure is maintained for about four hours, the boiler being constantly but slowly rotated, and the stock within the boiler being thus kept in gentle agitation.

A well-known method, patented by Letters Patent No. 17,387, of reducing straw to pulp, is to employ a solution of caustic alkali of a strength indicating 2° to 3° Baumé, seventy gallons of the solution to one hundred pounds of cut straw, the whole being placed in a boiler under a pressure of not less than eighty-four pounds to the square inch, for about three hours' time. We find in practice that the above method does not sufficiently disintegrate the straw, nor does it sufficiently dissolve or remove the albuminous and silicious matters from the fibrous portions. The pulp produced is therefore coarse, rough, dark-colored, and quite impure, and the paper made therefrom is so brittle as often to break when bent, is weak, rough, and of no great merchantable value. In order to consume it usefully, a large percentage of better and more costly fibrous material, such as linen, cotton, or manilla pulp must be mixed with it.

Our improvement effects an almost complete separation of the silicious, albuminous, and other proximate substances, leaving the fibrous portions nearly pure, and producing a fine light-colored and greatly improved pulp, which readily converts into a good, strong, pliable and useful article of paper without admixture of other fibrous material. On comparison of the pulp produced from straw by our method, and that made after the mode described in the patent before mentioned, a very marked difference in appearance is observable in favor of our invention. The paper made from the pulp above mentioned also presents the same striking difference in favor of our improvement. We have found an improved result in the use of heat indicated by an internal pressure of from one hundred and ten pounds to one hundred and thirty pounds to the square inch. If a pressure greater than one hundred and thirty pounds is attained, and maintained for any considerable time, the effect upon the color of the fibre and upon its bleaching qualities is unfavorable. It produces a browning effect similar to that of scorching, and should be avoided. A higher temperature than that indicated by an internal pressure of one hundred and thirty pounds to the square inch is both unsafe and unnecessary, and cannot be used with economy.

We do not claim boiling the stock under a pressure of eighty-four pounds or thereabouts, nor do we claim any other part or feature of the process described in the Letters Patent aforesaid, (No. 17,387,) nor do we claim broadly the use of alkaline liquors as a boiling liquor, nor the boiling of the straw or other stock therewith under pressure; but having thus described our process, what we claim, and desire to secure by Letters Patent, is—

The boiling of straw or other paper stock in a caustic alkaline solution of any desirable strength, according to the refractory character of the stock being treated, at a temperature, indicated by an internal pressure due to heat, marking one hundred and ten pounds to one hundred and thirty pounds' pressure to the square inch, substantially in the manner and for the purpose above described

J. B. PALSER,
GARDNER HOWLAND.

Witnesses:
J. N. TIFFANY,
EDWARD WADE.